United States Patent
Liu et al.

(10) Patent No.: US 12,455,810 B2
(45) Date of Patent: Oct. 28, 2025

(54) SYSTEMS AND METHODS FOR EMULATING AND TESTING DATA FLOWS IN DISTRIBUTED COMPUTING SYSTEMS

(71) Applicant: Keysight Technologies, Inc., Santa Rosa, CA (US)

(72) Inventors: Winston Wencheng Liu, Woodland Hills, CA (US); Konstantin Belov, Thousand Oaks, CA (US); Ankur Pankaj Sheth, Agoura Hills, CA (US); Dan Mihailescu, Mogosoaia (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 123 days.

(21) Appl. No.: 18/131,276

(22) Filed: Apr. 5, 2023

(65) Prior Publication Data
US 2024/0338307 A1 Oct. 10, 2024

(30) Foreign Application Priority Data
Apr. 4, 2023 (RO) .............................. a 2023 00166

(51) Int. Cl.
G06F 11/34 (2006.01)
G06F 9/50 (2006.01)
G06F 11/3668 (2025.01)

(52) U.S. Cl.
CPC ...... *G06F 11/3684* (2013.01); *G06F 11/3688* (2013.01); *G06F 11/3692* (2013.01); *G06F 9/5077* (2013.01); *G06F 9/5083* (2013.01)

(58) Field of Classification Search
CPC ............. G06F 11/3684; G06F 11/3688; G06F 11/3692; G06F 9/5083; G06F 9/5077
See application file for complete search history.

(56) References Cited

U.S. PATENT DOCUMENTS

| | | | |
|---|---|---|---|
| 8,799,720 B2 * | 8/2014 | Lau | G06F 11/3684 714/38.1 |
| 10,176,550 B1 * | 1/2019 | Baggerman | G06T 1/60 |

(Continued)

OTHER PUBLICATIONS

L. Yang, F. Wen, J. Cao and Z. Wang, "EdgeTB: A Hybrid Testbed for Distributed Machine Learning at the Edge With High Fidelity," in IEEE Transactions on Parallel and Distributed Systems, vol. 33, No. 10, pp. 2540-2553, Oct. 1, 2022, doi: 10.1109/TPDS.2022. 3144994. (Year: 2022).*

(Continued)

*Primary Examiner* — Anibal Rivera (57) ABSTRACT

Methods, systems, and computer readable media for emulating and testing data flows in distributed computing systems. An example system includes a workload abstractor configured for receiving monitored traffic in a distributed computing system performing a machine learning task and generating, using the monitored traffic, a test environment-agnostic workload model for the machine learning task and storing the test environment-agnostic workload model in a workload model repository with one or more other workload models. The system includes a test controller configured for selecting a test case for the machine learning task and a testbed mode for the test case; executing the test case by translating the test environment-agnostic workload model into a testbed-specific workload model for the testbed mode; and reporting, based on executing the test case, one or more performance metrics for the machine learning task.

17 Claims, 7 Drawing Sheets

(56) References Cited

U.S. PATENT DOCUMENTS

| | | | |
|---|---|---|---|
| 10,698,737 B2 | 6/2020 | Fachini et al. | |
| 11,296,967 B1* | 4/2022 | Rothstein | H04L 43/10 |
| 2019/0102700 A1 | 4/2019 | Babu et al. | |
| 2020/0327371 A1 | 10/2020 | Sharma et al. | |
| 2022/0245441 A1* | 8/2022 | Dechene | H04L 45/08 |
| 2022/0245462 A1* | 8/2022 | Dechene | G06N 3/10 |
| 2022/0247643 A1* | 8/2022 | Dechene | H04L 45/64 |
| 2022/0335317 A1* | 10/2022 | Segner | G06N 20/00 |
| 2023/0031470 A1* | 2/2023 | Singh | G06N 3/0464 |
| 2023/0342278 A1* | 10/2023 | Padmanabha Iyer | G06N 5/043 |
| 2024/0045831 A1* | 2/2024 | Bafna | G06N 3/08 |

OTHER PUBLICATIONS

Zhihan LV et al., Novel Machine Learning for Big Data Analytics in Intelligent Support Information Management Systems, Oct. 2021, [Retrieved on Jun. 2, 2025]. Retrieved from the internet: <URL: https://dl.acm.org/doi/full/10.1145/3469890> 21 Pages (1-21) (Year: 2021).*

Grigori Fursin et al., "Collective Knowledge: organising research projects as a database of reusable components and portable workflows with common APIs", Philosophical Transactions of the Royal Society, Jun. 12, 2020.

Grigori Fursin et al., "A Collective Knowledge workflow for collaborative research into multi-objective autotuning and machine learning techniques", Raspberry Pi foundation, UK Aug. 15, 2017.

* cited by examiner

SYSTEMS AND METHODS FOR EMULATING AND TESTING DATA FLOWS IN DISTRIBUTED COMPUTING SYSTEMS

PRIORITY CLAIM

This application claims the priority benefit of Romanian Patent Application No. a 2023 00166, entitled SYSTEMS AND METHODS FOR EMULATING AND TESTING DATA FLOWS IN DISTRIBUTED COMPUTING SYSTEMS, filed on Apr. 4, 2023, the disclosure of which is incorporated herein by reference in its entirety.

TECHNICAL FIELD

The subject matter described herein relates to methods, systems, and computer readable media for emulating and testing data flows in distributed computing systems, e.g., distributed heterogeneous compute systems.

BACKGROUND

Architecting systems that use different transports over various network topologies to create large artificial intelligence clusters is a challenging task. One of the main challenges is the need to support different transports, such as InfiniBand, Ethernet, and remote direct memory access (RDMA) over converged ethernet (ROCE), which have different performance characteristics. Another challenge is the need to support different network topologies, such as fat-tree, torus, and dragonfly, which have different trade-offs between cost, performance, and scalability.

There are also challenges in designing the software stack for large-scale AI clusters. One of the main challenges is the need to support different programming models, such as message passing interface (MPI), open multi-processing (OpenMP), and compute unified device architecture (CUDA), which have different trade-offs between performance and ease of use. Another challenge is the need to support different machine learning frameworks, such as TensorFlow, PyTorch, and Caffe, which have different trade-offs between performance and flexibility.

Accordingly, a need exists for methods, systems, and computer readable media for emulating and testing data flows in distributed computing systems.

SUMMARY

Methods, systems, and computer readable media for emulating and testing data flows in distributed computing systems. An example system includes a workload abstractor configured for receiving monitored traffic in a distributed computing system performing a machine learning task and generating, using the monitored traffic, a test environment-agnostic workload model for the machine learning task and storing the test environment-agnostic workload model in a workload model repository with one or more other workload models. The system includes a test controller configured for selecting a test case for the machine learning task and a testbed mode for the test case; executing the test case by translating the test environment-agnostic workload model into a testbed-specific workload model for the testbed mode; and reporting, based on executing the test case, one or more performance metrics for the machine learning task.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for emulating and testing data flows in distributed computing systems.

The difficulty of co-designing large-scale AI training and inference clusters stems from the fact that models, software, and hardware of the stack are created by separate companies who cannot disclose their proprietary intellectual properties due to competitive and privacy concerns. Operators, system vendors, and silicon vendors alike face the challenge of architecting systems that use different transports over various network topologies to create artificial intelligence (AI) clusters on orders of 2-4 k accelerators and 0.8-8 Tbps of network IO per accelerator.

Network operators have knowledge of the target workload, network and system design. However, operators may not be able to investigate the effects of the NIC or switches because they do not have access to detailed design information or simulation models for the NIC or switches.

System vendors use test setups and perform microbenchmarks to gain understanding of switch behavior by external observations. Lacking knowledge of the target workload and the chip design, they have challenges to root cause and optimize the end-to-end system behaviors.

Semiconductor vendors have disjointed efforts, some driven empirically (no simulation), some specifically on a specific switch family based on throughput at 100G link speeds with RDMA network interface controllers (NICs), and some driven by the NIC team using RDMA NICs at 100/200G speeds. Again, lacking knowledge of the end target workload like the operators, it is hard to quantify system level behavior and improve co-design.

Currently, testing these systems involves a significant investment of resources, including personnel, capital expenditure, and inter-company collaboration. The tests cover various I/O Interconnect domains, including chip-level interconnects such as quickpath interconnect (QPI)/ultra path interconnect express (UCIe), peripheral component interconnect express (PCIe)/compute express link (CXL), and other intra-node interconnects, as well as Ethernet/InfiniBand interconnects for inter-node connectivity.

This document describes example multi-mode test systems for testing distributed computing systems, e.g., distributed heterogeneous compute systems having one or more central processing units (CPUs), field programmable gate arrays (FPGAs), graphics processing units (GPUs), and/or other hardware accelerators. Multi-mode test systems generate test environment-agnostic workload models for machine learning tasks and execute test cases by translating a test environment-agnostic workload model into a testbed-specific workload model for a testbed mode.

Figure 1:
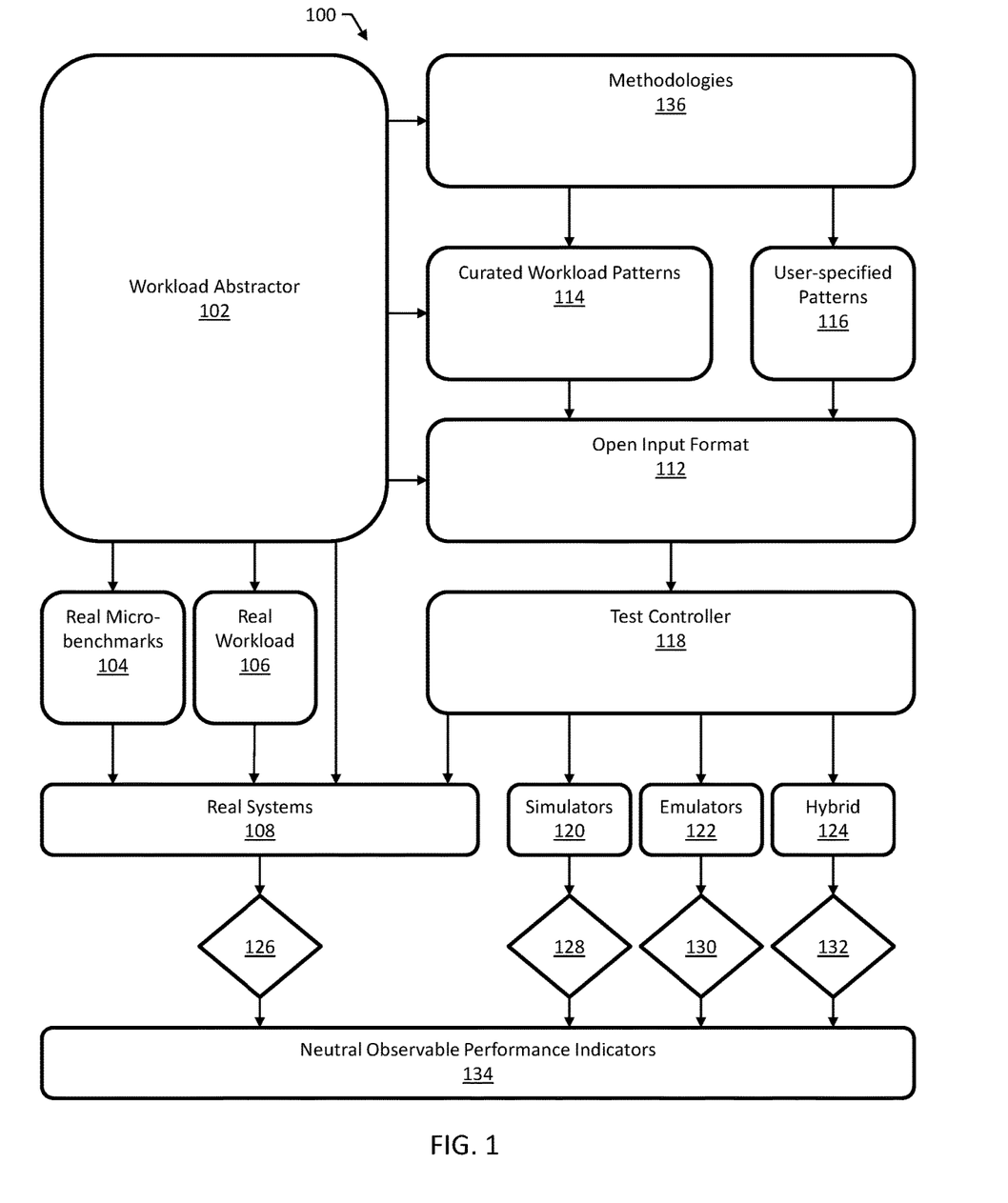
FIG. 1 is a block diagram of an example multi-mode test system for emulating and testing data flows in distributed computing systems.

FIG. 1 is a block diagram of an example multi-mode test system 100 for emulating and testing data flows in distributed computing systems. The test system 100 includes a workload abstractor 102 and a test controller 118, each of which can be implemented on one or more computer systems having one or more processors and memory storing executable instructions for the processors.

The workload abstractor 102 is configured for receiving monitored traffic in a distributed computing system performing a machine learning task. The workload abstractor 102 is configured for generating, using the monitored traffic, a test environment-agnostic workload model for the machine learning task. The workload abstractor 102 is configured for storing the test environment-agnostic workload model in a workload model repository with one or more other workload models.

The test controller 118 is configured for selecting a test case for the machine learning task and a testbed mode for the test case. The test controller 118 is configured for executing the test case by translating the test environment-agnostic workload model into a testbed-specific workload model for the testbed mode, including generating an input feed stream and providing the input feed stream to a testbed corresponding to the testbed mode. The test controller 118 is configured for reporting, based on executing the test case, one or more performance metrics for the machine learning task. The test controller 118 can be configured for executing one or more user-defined test methodologies.

Receiving monitored traffic in a distributed computing system performing a machine learning task can include receiving the monitored traffic from one or more taps or probes for the distributed computing system. Generating, using the monitored traffic, the test environment-agnostic workload model for the machine learning task can include removing one or more deployment-specific dependencies or attributes or both from the monitored traffic.

Selecting the testbed mode can include selecting one of: a simulated testbed, an emulated testbed, a physical device testbed, or a hybrid testbed. The system 100 can be configured for receiving, from a test system user, a custom workload model and storing the custom workload model in the workload model repository.

Reporting one or more performance metrics for the machine learning task comprises applying one or more output normalization rules to the performance metrics and generating one or more test environment-agnostic metrics. For example, reporting the performance metrics can include displaying the performance metrics on a display device to a system administrator, sending the performance metrics to a remote system, or storing the performance metrics in a repository of related data.

Figure 2:
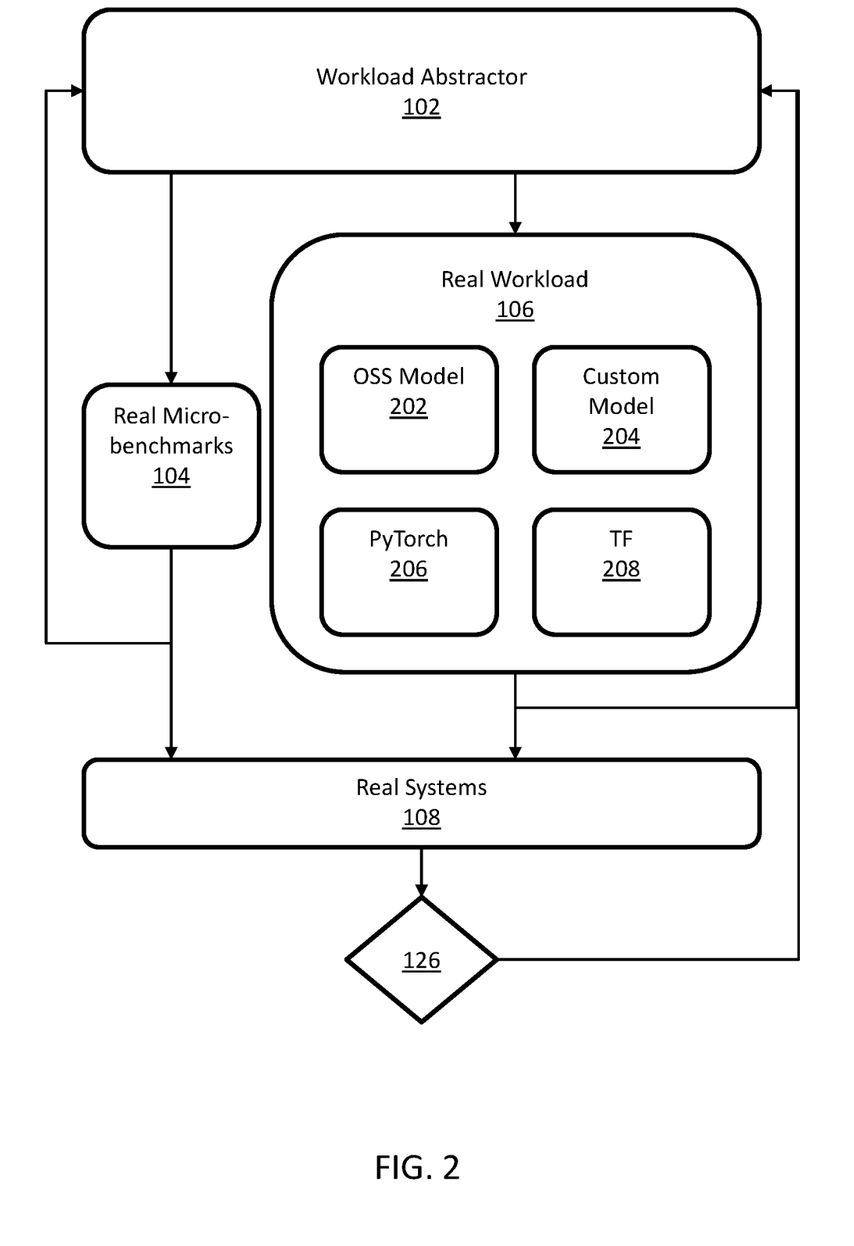
FIG. 2 is a block diagram of a workload data collection portion of the multi-mode test system.

FIG. 2 is a block diagram of a workload data collection portion of the multi-mode test system 100. FIG. 2 shows the workload abstractor 102 and one or more "real" systems 108, e.g., including at least one distributed computing system performing a machine learning task. The machine learning task can be any appropriate type of task, such as training of models or inferencing.

Distributed computing systems are commonly used for machine learning tasks due to their ability to process and analyze large amounts of data in parallel, resulting in faster training and improved accuracy. Machine learning tasks that can benefit from a distributed computing system include image recognition, natural language processing (NLP), recommender systems, fraud detection, and autonomous vehicles.

For example, deep learning models for image recognition require large amounts of data and compute power. A distributed computing system can be used to train these models in parallel, allowing them to learn from millions of images and recognize objects with high accuracy. NLP models are often trained on large corpora of text data, which can be too large to fit on a single machine. A distributed computing system can be used to process this data in parallel, allowing NLP models to be trained more quickly and accurately.

As shown in FIG. 2, the workload abstractor 102 is configured to observe execution of the real systems 108 while executing a "real" workload, e.g., a machine learning and/or artificial intelligence training task. Real workloads can include, for example, a real micro-benchmarks workload 104 or other types of workloads 106. FIG. 2 shows example workloads including an open source software (OSS) model workload 202, a custom model workload 204, a PyTorch workload 206, and a TensorFlow workload 208.

OSS refers to software whose source code is publicly available and can be modified, distributed, and used by anyone for any purpose. Many machine learning frameworks, libraries, and tools are open source, such as TensorFlow, PyTorch, Scikit-learn, and Apache Spark.

The OSS workload 202 can include a machine learning task that is performed using open source software. For example, training a deep learning model using TensorFlow or PyTorch, analyzing data using Scikit-learn, or processing large datasets using Apache Spark. Since the source code of these tools is publicly available, users can modify and customize them to fit their specific needs and optimize performance for their particular hardware and data. This flexibility and openness are particularly useful in distributed computing environments, where performance and scalability are critical and hardware configurations can vary widely.

The real micro-benchmarks 104 can include, e.g., nccl-test, PARAM-cc. The OSS workload 202 can include, e.g., communication patterns extracted from open source neural network models such as PARAM-DLRM, ImageNet for vision, and open pretrained transformers (OPT). PyTorch workloads 206 can include, e.g., proprietary neural network architectures an entity is training or researching that have not been shared or published.

In some examples, the workload abstractor 102 includes an integrated monitoring/data collection subsystem configured to observe execution of the workloads in the real systems 108. For example, the system can include one or more taps and/or probes that are used to observe and copy internal and/or external communications traffic generated by the real systems 108 while executing the real workloads.

The taps and/or probes can include, e.g., physical taps on communication links, internal port mirror taps, software-based probes (e.g., u-probes, k-probes, Berkely packet filter (BPF)/ePBF agents, and the like. These taps can capture and observe network communications performance metrics 126, e.g., messages or packets in their entirety, or may copy only a portion of the observed communications, or may generate summary records (e.g., flow records, packet metrics and/or statistics, and the like).

In some examples, the observed performance metrics 126 can include computer system resource information and associated performance metrics, e.g., CPU utilization, memory utilization, bandwidth utilization, and the like. The test system can obtain computer system resource information and associated performance metrics through a variety of means, depending on the specific configuration of the system being tested. For instance, the test system can use one or more of operating system APIs, instrumentation, or external monitoring tools.

The test system can use APIs provided by the operating system to collect system resource information and performance metrics. For example, on a Linux system, the system could use the/proc file system to gather information about CPU utilization, memory usage, and other system parameters. Similarly, on a Windows system, the test system could use the Windows Management Instrumentation (WMI) interface to collect performance data.

The test system can use instrumentation software to monitor system performance metrics in real-time. This could involve running software agents on the system being tested that collect data and send it to the test system. Alternatively, the system being tested could have built-in instrumentation that sends performance data to the test system.

Once the test system has collected the system resource information and performance metrics, it can apply processing to convert, transform, or abstract the data into an open input format that can be used across different testbed environments. The resulting workload data model can then be used in various testing scenarios to evaluate the performance of the system being tested.

Figure 3:
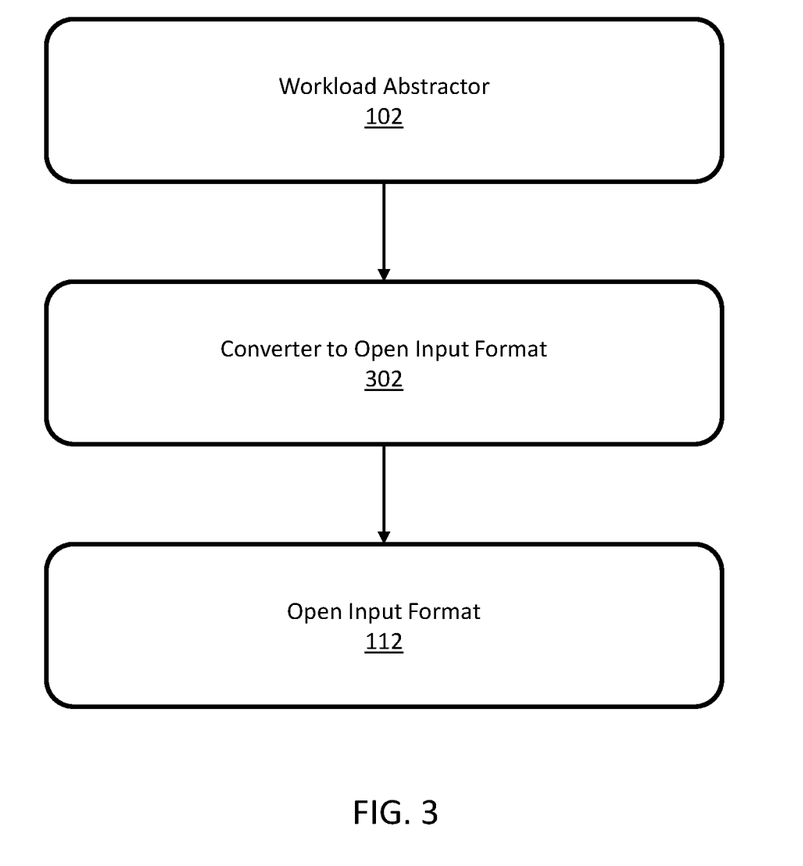
FIG. 3 is a block diagram of a workload data abstraction portion of the multi-mode test system.

FIG. 3 is a block diagram of a workload data abstraction portion of the multi-mode test system 100. FIG. 3 shows the workload abstractor 102 and a converter 302 to an open input format 112. The system is configured to receive the observed real workload and environment data (described in FIG. 2) and to apply processing to the real workload & environment data (e.g., dataflow graph or execution context/graph) that converts/transforms/abstracts it into an open input format (OIF).

The converter 302 is configured to perform OIF processing that removes deployment-specific dependencies and attributes from the collected real workload and environment data, effectively creating a test environment-agnostic workload data model that can be used in different testbed environments (e.g., simulation environment, emulation environment, real device, and hybrid emulation-real device environment, etc.) that are supported by the test system.

Removing deployment-specific dependencies and attributes from the collected real workload and environment data involves identifying and removing any data elements that are specific to the particular deployment of the workload in question.

These deployment-specific dependencies and attributes can take many forms, including network configuration, hardware configurations, system settings, and other environment-specific factors. Removing these elements ensures that the workload data model can be used across different testbed environments without being tied to a particular deployment.

The OIF processing performed by the converter in the system removes these dependencies and attributes by replacing them with more generic, abstracted data that is not tied to any specific environment. For example, network addresses and specific hardware configurations may be replaced with more general descriptions of network topology or hardware capabilities.

The resulting workload data model is designed to be flexible and adaptable, allowing it to be used in a wide range of testing environments. By removing deployment-specific dependencies and attributes, the system can create workload data models that are reusable and can be easily applied in different test scenarios, reducing the time and effort required to set up and run tests.

Figure 4:
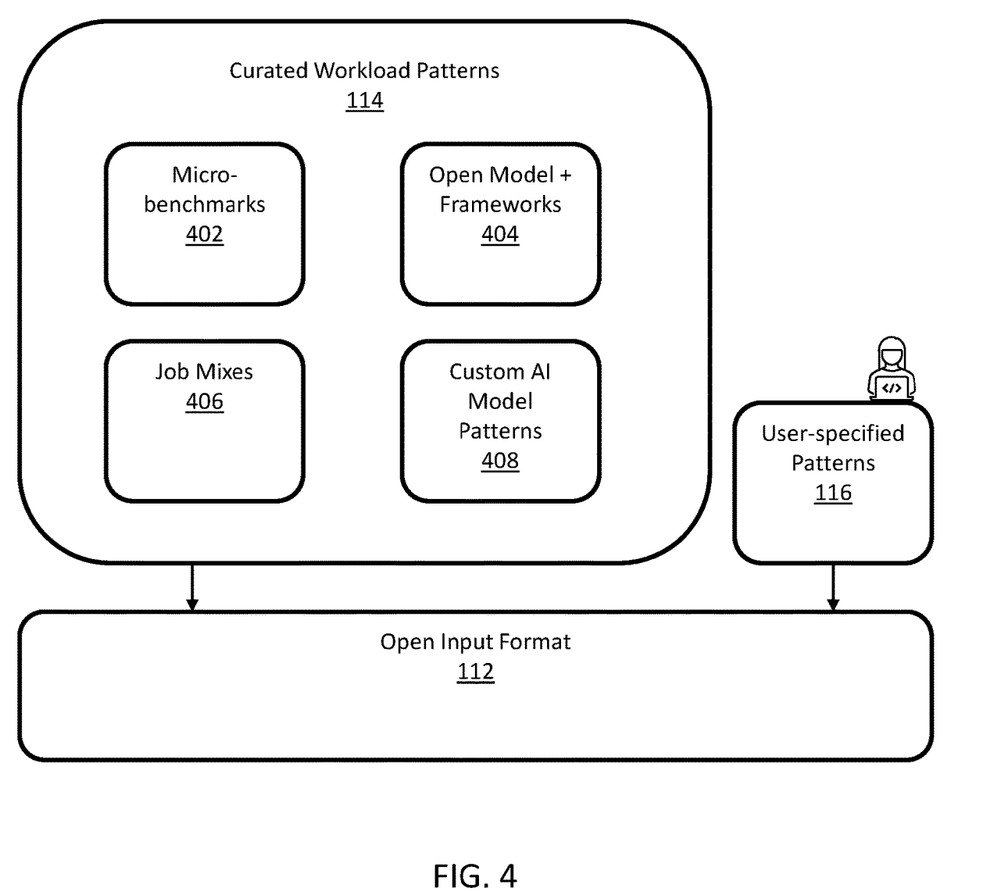
FIG. 4 is a block diagram illustrating curated workload patterns as used in the multi-mode test system.

FIG. 4 is a block diagram illustrating curated workload patterns as used in the multi-mode test system 100. FIG. 4 shows the curated workload patterns 114, user-specified patterns 116, and the open input format 112.

The test environment-agnostic workload data models are stored/curated in a test system workload model repository 114, where they can be accessed and used to seamlessly conduct tests across multiple testbed environment modes (e.g., simulation mode, emulation mode, real device, and hybrid mode, etc.).

In some examples, a test system user may specify/construct their own custom workload model, which may be stored and accessed in a repository 116 in a manner similar to that described for the observed, real workload-based models. A test case may specify/identify/select one of the curated test environment-agnostic workload data models that is to be used in conjunction with/to drive a test associated with a system under test, where the test is conducted via one of the test system's available test environment modes (e.g., simulation mode, emulation mode, real device, and hybrid mode, etc.).

As shown in the example of FIG. 4, the curated workload patterns 114 include micro-benchmarks 402, open model and frameworks 404, job mixes 406, and custom AI model patterns 408. In general, the curated workload patterns 114 can include any appropriate type of test environment-agnostic workload data model.

Figure 5:
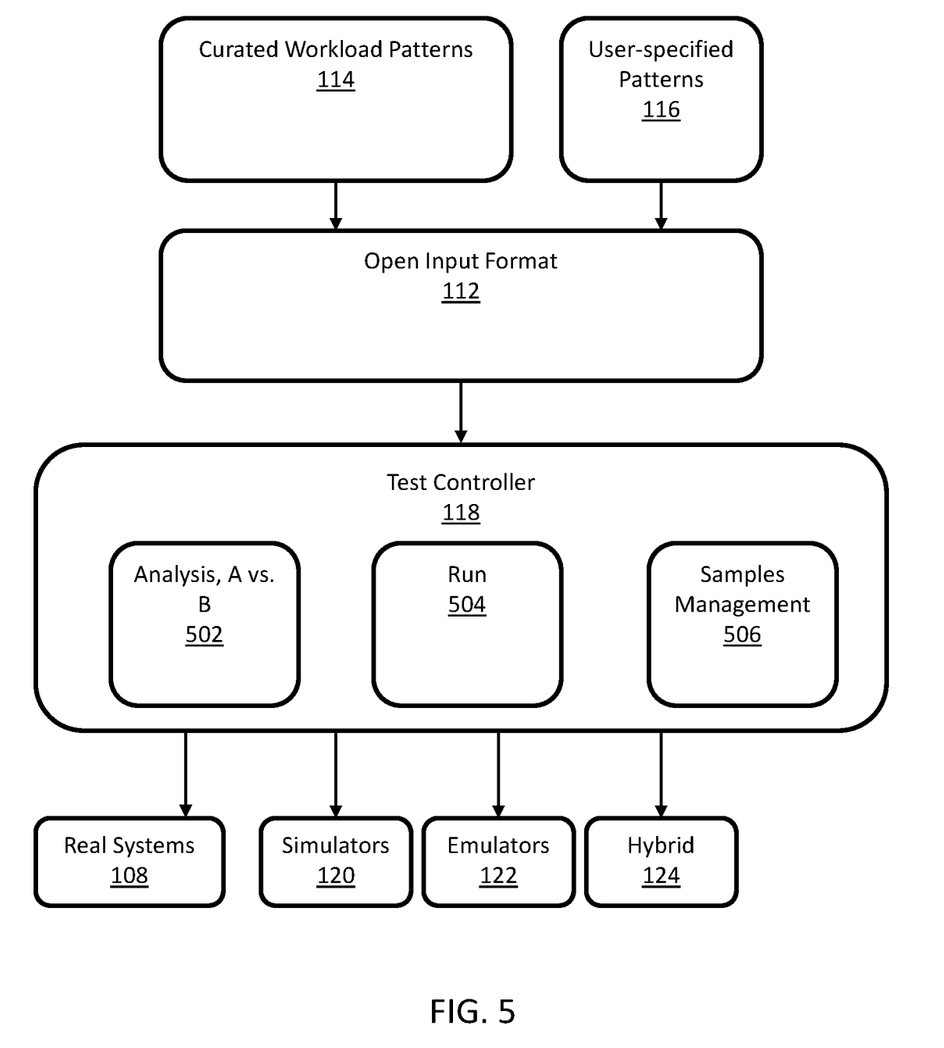
FIG. 5 is a block diagram illustrating testbed mode-dependent workload input feeds within the multi-mode test system.

FIG. 5 is a block diagram illustrating testbed mode-dependent workload input feeds within the multi-mode test system 100. FIG. 5 shows the test controller 118 as well as the curated workload patterns 114 and user-specified patterns 116 from FIG. 4.

The test controller 118 is configured to execute a user-specified test case. The test case definition can include, for example, information that implicitly or explicitly specifies the testbed mode that is to be implemented (e.g., simulation mode, emulation mode, real device mode, and hybrid mode, etc.). In another example, the user may select and specify both the test case and the testbed mode that is to be invoked (e.g., "run test case #1 in full simulation mode", "run test case #1 in emulation mode using emulator device X", etc.).

The appropriate test environment-agnostic workload data model is accessed and processed by the test controller 118, to generate an input feed stream that is provided to the testbed, e.g., via an application programming interface (API). For the same selected workload model, each different testbed mode could potentially have a different API and a different input feed stream depending on the specific requirements of each testbed.

As shown in the example of FIG. 5, the test controller 118 includes, for executing and orchestrating tests, several example test modules: an A/B analysis module 502, a test run module 504, and a samples management module 506. The test controller 118 can run tests on one or more simulators 120 (e.g., simulated distributed computing systems), one or more emulators 122 (e.g., emulated distributed computing systems), and/or one or more hybrid systems 124 (e.g., systems including simulated, emulated, and/or physical computing components).

To illustrate the operation of the test controller 118, consider an example test case where an all-reduce operation will exchange X amount of data, followed by an all-2-all operation that will exchange Y amount of data, and the test case specifies to apply that workload over a cluster of size Z. So, the curated content will have some default values for X, Y, Z based on the observed real workloads and curated template workloads. The test controller 118 creates an instantiation of the selected template with specific values of X, Y, Z (either as default or user modifications).

Figure 6:
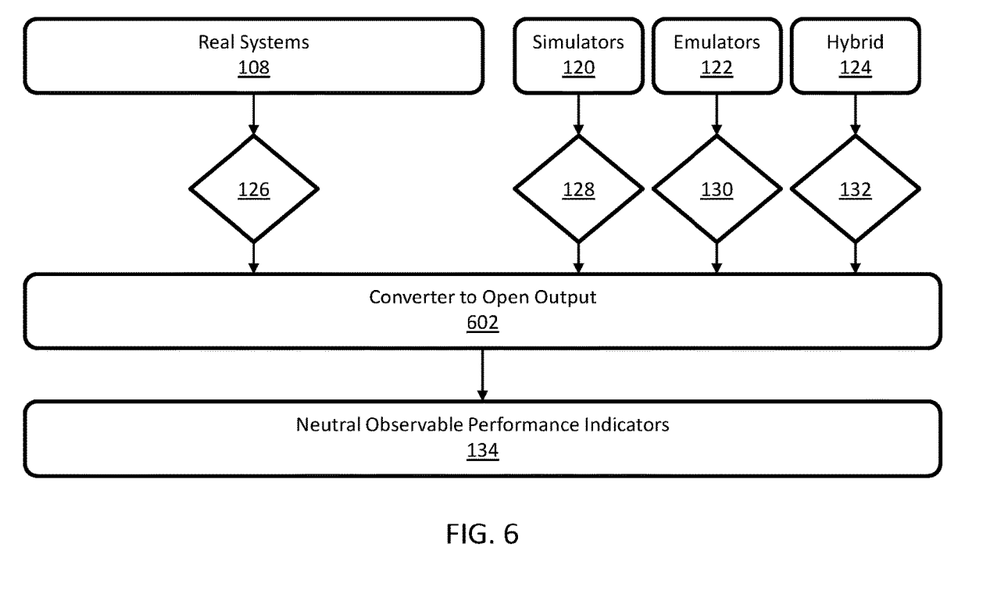
FIG. 6 is a block diagram illustrating a test result normalization portion of the multi-mode test system.

FIG. 6 is a block diagram illustrating a test result normalization portion of the multi-mode test system 100. FIG. 6 shows the different testbeds for the available testbed modes, including the simulators 120, emulators 122, and hybrid systems 124. From each of these testbeds, the system observes and records metrics 128, 130, and 132 associated with execution of a test case. The metrics 128, 130, and 132 can include key performance indicators (KPIs) or other appropriate data.

The metrics 128, 130, and 132 are processed by an output converter/normalizer 602, which applies output normalization rules that are associated with selected test environment-agnostic workload data models. As a result, the reported output of the test system includes open and neutral performance indicators 134 that allow meaningful comparisons of a test case that is run on different testbeds.

Figure 7:
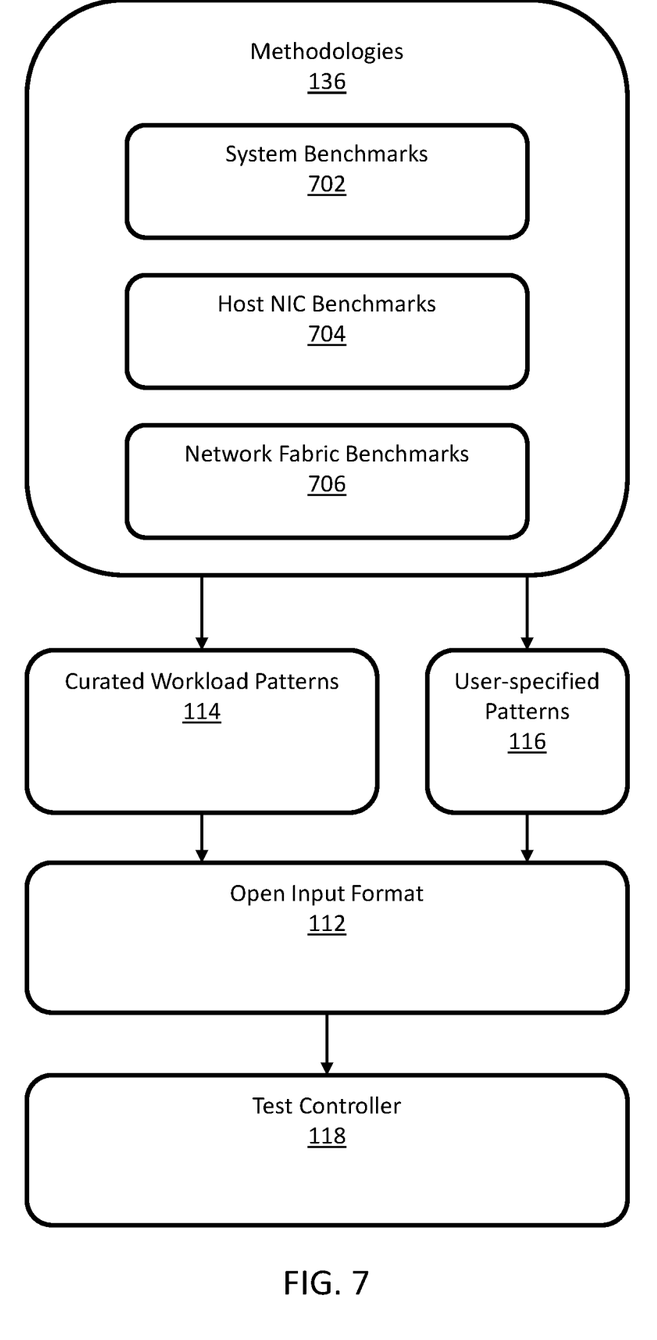
FIG. 7 is a block diagram illustrating a test methodologies portion of the multi-mode test system.

FIG. 7 is a block diagram illustrating a test methodologies portion of the multi-mode test system 100. In some examples, the system 100 allows users to define and implement testing methodologies 136. For example, a test methodology may involve execution of a test case a predetermined number of times, such that the resulting KPI dataset can be statistically analyzed. Another example methodology may involve execution of a collection of test cases involving one or more curated workload data models.

Testing network traffic within real or simulated machine learning clusters can be complex, as it involves multiple components and interactions between them. One example test methodology is functional testing, which verifies the functionality of the network traffic system in the machine learning cluster. This includes testing the ability of the system to send and receive traffic, as well as verifying that traffic is correctly routed and processed.

Another example test methodology is performance testing, which verifies the performance of the system under different loads and traffic conditions. This includes testing the system's ability to handle high volumes of traffic, as well as verifying that traffic is processed within acceptable response times. Other example test methodologies can include stress testing, security testing, and integration testing.

Stress testing verifies the system's ability to handle extreme loads and traffic conditions. This includes testing the system's ability to handle unexpected spikes in traffic, as well as verifying that the system can recover from failures and continue to operate correctly.

Security testing verifies the system's ability to detect and prevent security threats such as DDOS attacks, packet sniffing, and unauthorized access. This includes testing the system's ability to encrypt traffic and verify the authenticity of incoming traffic.

Integration testing verifies the interaction between different components in the machine learning cluster. This includes testing the compatibility of different hardware and software components, as well as verifying that traffic is correctly routed between different components.

As shown in the example of FIG. 7, the example methodologies 136 includes system benchmarks 702, host network interface controller (NIC) benchmarks 704, and network fabric benchmarks 706. The test controller 118 uses the methodologies 136 in the execution of various test cases.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system comprising:
at least one hardware processor;
a workload abstractor implemented using the at least one hardware processor and configured for:
receiving monitored traffic in a distributed computing system performing a machine learning task, wherein the machine learning task includes using the distributed computing system to train a machine learning model or perform inferencing using the machine learning model;
generating, using the monitored traffic, a test environment-agnostic workload model for the machine learning task, wherein generating, using the monitored traffic, the test environment-agnostic workload model for the machine learning task comprises removing one or more deployment-specific dependencies and attributes from the monitored traffic, wherein removing the one or more deployment-specific dependencies includes removing attributes relating to network configuration used by the distributed computing system; and
storing the test environment-agnostic workload model in a workload model repository with one or more other workload models; and
a test controller implemented using the at least one hardware processor and configured for:
selecting a test case for the machine learning task and a testbed mode for the test case;
executing the test case by translating the test environment-agnostic workload model into a testbed-specific workload model for the testbed mode, including generating an input feed stream and providing the input feed stream to a testbed corresponding to the testbed mode to test at least one aspect of a machine learning cluster that executes the machine learning task and uses a different transport or network topology than the distributed computing system; and
reporting, based on executing the test case, one or more performance metrics for the machine learning task.

2. The system of claim 1, wherein receiving monitored traffic in a distributed computing system performing the machine learning task comprises receiving the monitored traffic from one or more taps or probes for the distributed computing system.

3. The system of claim 1, wherein selecting the testbed mode comprises selecting one of: a simulated testbed, an emulated testbed, a physical device testbed, or a hybrid testbed.

4. The system of claim 1, wherein the system is configured for receiving, from a test system user, a custom workload model and storing the custom workload model in the workload model repository.

5. The system of claim 1, wherein reporting the one or more performance metrics for the machine learning task comprises applying one or more output normalization rules to the one or more performance metrics and generating one or more test environment-agnostic metrics.

6. The system of claim 1, wherein the test controller is configured for executing one or more user-defined test methodologies.

7. A method comprising:
receiving monitored traffic in a distributed computing system performing a machine learning task, wherein the machine learning task includes using the distributed computing system to train a machine learning model or perform inferencing using the machine learning model;
generating, using the monitored traffic, a test environment-agnostic workload model for the machine learning task, wherein generating, using the monitored traffic, the test environment-agnostic workload model for the machine learning task comprises removing one or more deployment-specific dependencies and attributes from the monitored traffic, wherein removing the one or more deployment-specific dependencies includes removing attributes relating to network configuration used by the distributed computing system;
storing the test environment-agnostic workload model in a workload model repository with one or more other workload models;
selecting a test case for the machine learning task and a testbed mode for the test case;
executing the test case by translating the test environment-agnostic workload model into a testbed-specific workload model for the testbed mode, including generating an input feed stream and providing the input feed stream to a testbed corresponding to the testbed mode to test at least one aspect of a machine learning cluster that executes the machine learning task and uses a different transport or network topology than the distributed computing system; and
reporting, based on executing the test case, one or more performance metrics for the machine learning task.

8. The method of claim 7, wherein receiving monitored traffic in a distributed computing system performing the machine learning task comprises receiving the monitored traffic from one or more taps or probes for the distributed computing system.

9. The method of claim 7, wherein selecting the testbed mode comprises selecting one of: a simulated testbed, an emulated testbed, a physical device testbed, or a hybrid testbed.

10. The method of claim 7, wherein the system is configured for receiving, from a test system user, a custom workload model and storing the custom workload model in the workload model repository.

11. The method of claim 7, wherein reporting the one or more performance metrics for the machine learning task comprises applying one or more output normalization rules to the one or more performance metrics and generating one or more test environment-agnostic metrics.

12. The method of claim 7, wherein the test controller is configured for executing one or more user-defined test methodologies.

13. A non-transitory computer readable medium having stored thereon executable instructions embodied in the non-transitory computer readable medium that when executed by at least one processor of a computer cause the computer to perform steps comprising:
receiving monitored traffic in a distributed computing system performing a machine learning task, wherein the machine learning task includes using the distributed computing system to train a machine learning model or perform inferencing using the machine learning model;
generating, using the monitored traffic, a test environment-agnostic workload model for the machine learning task, wherein generating, using the monitored traffic, the test environment-agnostic workload model for the machine learning task comprises removing one or more deployment-specific dependencies and attributes from the monitored traffic, wherein removing the one or more deployment-specific dependencies includes removing attributes relating to network configuration used by the distributed computing system;
storing the test environment-agnostic workload model in a workload model repository with one or more other workload models;
selecting a test case for the machine learning task and a testbed mode for the test case;
executing the test case by translating the test environment-agnostic workload model into a testbed-specific workload model for the testbed mode, including generating an input feed stream and providing the input feed stream to a testbed corresponding to the testbed mode to test at least one aspect of a machine learning cluster that executes the machine learning task and uses a different transport or network topology than the distributed computing system; and
reporting, based on executing the test case, one or more performance metrics for the machine learning task.

14. The non-transitory computer readable medium of claim 13, wherein receiving monitored traffic in a distributed computing system performing the machine learning task comprises receiving the monitored traffic from one or more taps or probes for the distributed computing system.

15. The non-transitory computer readable medium of claim 13, wherein selecting the testbed mode comprises selecting one of: a simulated testbed, an emulated testbed, a physical device testbed, or a hybrid testbed.

16. The non-transitory computer readable medium of claim 13, wherein the system is configured for receiving, from a test system user, a custom workload model and storing the custom workload model in the workload model repository.

17. The non-transitory computer readable medium of claim 13, wherein reporting the one or more performance metrics for the machine learning task comprises applying one or more output normalization rules to the one or more performance metrics and generating one or more test environment-agnostic metrics.

* * * * *

UNITED STATES PATENT AND TRADEMARK OFFICE
CERTIFICATE OF CORRECTION

PATENT NO. : 12,455,810 B2  
APPLICATION NO. : 18/131276  
DATED : October 28, 2025  
INVENTOR(S) : Winston Wencheng Liu et al.

Page 1 of 1

It is certified that error appears in the above-identified patent and that said Letters Patent is hereby corrected as shown below:

In the Claims

In Column 9, Line 1, in Claim 2, after "receiving" insert -- the --.

In Column 9, Line 2, in Claim 2, delete "a" and insert -- the --.

In Column 9, Line 10, in Claim 4, after "the" insert -- distributed computing --.

In Column 9, Line 54, in Claim 8, after "receiving" insert -- the --.

In Column 9, Line 55, in Claim 8, delete "a" and insert -- the --.

In Column 10, Line 6, in Claim 12, delete "the" and insert -- a --.

In Column 10, Line 47, in Claim 14, after "receiving" insert -- the --.

In Column 10, Line 47, in Claim 14, delete "a" and insert -- the --.

Signed and Sealed this  
Tenth Day of February, 2026

John A. Squires  
*Director of the United States Patent and Trademark Office*